US005187487A

United States Patent [19]

Riza

[11] Patent Number: 5,187,487

[45] Date of Patent: Feb. 16, 1993

[54] COMPACT WIDE TUNABLE BANDWIDTH PHASED ARRAY ANTENNA CONTROLLER

[75] Inventor: Nabeel A. Riza, Clifton Park, N.Y.

[73] Assignee: General Electric Company, Schenectady, N.Y.

[21] Appl. No.: 847,156

[22] Filed: Mar. 5, 1992

[51] Int. Cl.[5] .................. H01Q 3/22; G02B 27/10; G02B 27/46

[52] U.S. Cl. .................. 342/372; 342/368; 359/238; 359/285

[58] Field of Search .................. 342/368, 372; 359/238, 359/285, 349, 578, 583

[56] References Cited

U.S. PATENT DOCUMENTS

| | | | |
|---|---|---|---|
| 3,878,520 | 4/1975 | Wright | 342/368 |
| 4,864,312 | 9/1989 | Huignard et al. | 342/368 |
| 4,929,956 | 5/1990 | Lee et al. | 342/376 |
| 4,962,382 | 10/1990 | Lee | 359/285 |
| 4,976,520 | 12/1990 | Brandstetter et al. | 359/285 |
| 5,032,002 | 7/1991 | Fonneland et al. | 359/238 |

OTHER PUBLICATIONS

"Acousto-Optic Control of Phased-Array Antennas" N. A. Riza, May 1990, GE Technical Information Series.

*Primary Examiner*—Gregory C. Issing

*Attorney, Agent, or Firm*—Donald S. Ingraham; Marvin Snyder

[57] ABSTRACT

A compact, stable, and optically efficient two dimensional spatial light modulator-based electro-optical control system for large (>1000 elements) phase-based phased array antennas uses an acousto-optic modulator (AOM) driven by a microwave signal at the desired radar carrier. A phase delay is introduced via electrical control of an array of birefringent-mode nematic liquid crystal cells that selectively phase delays a polarized signal light beam, while a non-phase delayed doppler shifted polarized beam is used as a reference for microwave signal generation via interferometric detection through a photodiode. The optical design provides a very fast (in nsecs) wideband carrier hopping capability. An alternative embodiment of the invention uses a deformable mirror device (DMD) SLM to introduce the required phase shifts.

38 Claims, 4 Drawing Sheets

COMPACT WIDE TUNABLE BANDWIDTH PHASED ARRAY ANTENNA CONTROLLER

RELATED APPLICATIONS

This application is related to the application of N. Riza entitled "Phased Array Antenna Controller," Ser. No. 07/847,155, allowed Sep. 14, 1992, filed concurrently with this application and assigned to the assignee of the present application, and which related application is incorporated herein by reference.

BACKGROUND OF THE INVENTION

This invention relates generally to signal processing systems and more particularly to beamforming controls for phased array antenna systems.

Phased array antenna systems employ a plurality of individual antennas or subarrays of antennas that are separately excited to cumulatively produce a transmitted electromagnetic wave that is highly directional. The radiated energy from each of the individual antenna elements or subarrays is of a different phase, respectively, so that an equiphase beam front, or the cumulative wave front of electromagnetic energy radiating from all of the antenna elements in the array, travels in a selected direction. The difference in phase or timing between the antenna activating signals determines the direction in which the cumulative beam from all of the individual antenna elements is transmitted. Analysis of the phases of return beams of electromagnetic energy detected by the individual antennas in the array similarly allows determination of the direction from which a return beam arrives.

Beamforming, or the adjustment of the relative phase of the actuating signals for the individual antennas (or subarrays of antennas), can be accomplished by electronically shifting the phases of the actuating signals or by introducing a time delay in the different actuating signals to sequentially excite the antenna elements to generate the desired direction of beam transmission from the antenna. Most present-day phased array radars use modulo $2\pi$ antenna beamforming called phase-based beam control. This kind of beamforming limits the radar instantaneous bandwidths to approximately 1–2% of the radar carrier frequency. Nevertheless, this narrowband phase-based beamforming is used in nearly all operational radars today.

Modulo $2\pi$ electronic shifting the phases of the actuating signals requires extensive equipment, including switching devices (e.g. PIN diodes) to route the electrical signals through appropriate hardwired circuits to achieve the desired phase changes. Electronic or microwave phase shifters are designed for use at a specific frequency, i.e., the chosen radar carrier frequency, and thus have numerous drawbacks when employed in phased array antenna systems using broadband radiation or a wideband tunable bandwidth for implementing intrapulse beamforming. For example, most hardwired phase shifters are limited to frequency changes of about 5% of the design frequency of the shifter. The digital phase control microwave phase shifters also provide only a finite set of phase values, for example, a 6 bit phase shifter generates only 64 possible phase shifts.

Present-day phase-based electronically controlled phased array radar systems are relatively large, heavy, complex, and expensive. These electronic systems require a large number of microwave components such as phase shifters, power splitters, and waveguides to form the antenna control system. This arrangement results in a system with a narrow tunable bandwidth that is relatively lossy, electromagnetically sensitive, and very hardware-intensive. In addition, many phased array antenna systems or radars use mechanical scanning in azimuth, with electronic scanning in height. These mechanical scanning systems are also relatively large, heavy, and slow.

Ideally, a phased array antenna control system should be light, compact, relatively immune to undesirable electromagnetic radiation, and simple and straightforward to fabricate, operate, and maintain. Such a system also desirably has a wide antenna tunable bandwidth, and an inertialess, motion-free high resolution beam scanning ability with application-dependent slow-to-fast scanning speeds. The wide tunable bandwidth provides the radar with a "frequency hopping" capability that makes it very difficult to jam or detect. It is additionally advantageous to have an analog beamforming control system that allows a large number of possible phase shift combinations. Such an analog system is in contrast to digital phase control from microwave phase shifters, which phase control provides a fixed number of possible phase actuation signals. This limited number of possible actuation signals in turn limits the phase resolution achievable with the microwave devices, thus limiting the angular resolution of the scanned antenna beam. Further, in conventional electronically controlled phased arrays, the digital microwave phase shifters are also typically used for correcting phase errors that result due to the other microwave devices in the system. Because of the digital nature of the phase shifters, the phase errors can only be partially cancelled. With the liquid crystal (LC) analog phase control, these phase errors can be almost completely cancelled.

Optical control systems can be advantageously used to generate control signals for phased array antennas. For example, an optical control system for generating differentially time-delayed optical control systems is presented in the copending applications of N. Riza entitled "Reversible Time Delay Beamforming Optical Architecture for Phased Array Antennas, "Ser. No. 07/690,421, filed Apr. 24, 1991, allowed Dec. 18, 1991; and "Time-Multiplexed Phased Array Antenna Beam Switching System," Ser. No. 07/826,501, filed Jan. 27, 1992. Both of these copending applications are assigned to the assignee of the present invention and are incorporated herein by reference.

Liquid crystal devices are advantageously used in such control systems as spatial light modulators to selectively adjust the linear polarization of light used in the processing system. Large size liquid crystal (LC) arrays have been successfully employed in a number of applications, including flat panel projection displays, high definition television, and aircraft cockpit displays. These LC displays are based on nematic liquid crystals, which have relatively high (0.2) optical birefringence and which are readily controlled by small (e.g., 5 volts) electrical signals. Nematic LCs have been used to make commercial displays that have large area arrays with large numbers of pixels (e.g., > one million pixels). These arrays have a relatively low fabrication cost and typically use thin-film transistor (TFT) electrical addressing circuits to control the pixels. The number of pixels and area of array of a two-dimensional (2-D) LC array is an important consideration in choosing the LC type that will provide the highest performance at an acceptable cost. For example, in a state of the art four-faced phased array radar system currently in production, each of the four faces of the antenna has 4400 elements. Thus, to separately control each antenna element using an optical signal control system with a liquid crystal array requires 4400 switching LC elements per 2-D array. Nematic LC's are readily fabricated in large arrays, and a number of effective thin-film transistor-based LC addressing techniques using 5 V video signals have been developed for driving LC pixels in such an array. In addition, nematic LCs have shown on/off ratios as good as 4000:1.

Deformable mirror devices (DMDs) can also be used as spatial light modulators. In a DMD a control voltage applied to a piezo-electric device determines the displacement of a mirror attached to the piezo-electric device. When used as a spatial light modulator, the relative displacement of the mirrors in respective DMD pixels modulates the phase of the light beams reflected from the pixels.

As described in the co-pending application Ser. No. 07/826,501, filed Jan. 27, 1992 cited above, time multiplexing techniques can be efficaciously used to provide an optical control system that has minimal dead times between respective transmit/receive sequences and fast (200 beams/sec or faster) antenna beam scanning speeds.

It is accordingly an object of this invention to provide an acousto-optic based processor that can generate analog phase-based modulo $2\pi$ phased array antenna beam control.

It is a further object of this invention to provide a phase-based antenna controller that can use either a liquid crystal spatial light modulator or a deformable mirror device as a spatial light modulator and that is relatively compact, lightweight and has an inertialess beam scanning structure.

Another object of this invention is to provide a phase-based antenna controller that has a wide (i.e., in the GHz range) tunable antenna bandwidth with stable phase-control and an independent, analog, phase-error calibration capability for all the elements in the array.

A further object of the present invention is to provide an optical beam switching technique that has low optical losses, low inter-channel crosstalk, and that is readily fabricated for use with a relatively large (e.g., $>1000$) number of phased array antenna elements.

SUMMARY OF THE INVENTION

In accordance with the present invention, an optical signal control system for the phased array antenna of a radar system, for example, comprises a source of coherent, linearly polarized light, an acousto-optic modulator (AOM), an optical phase modulating device, and a heterodyne detection device to convert the optical signals into electrical signals. The optical signal control system generates a cluster of reference beams of light and a cluster of signal beams of light; signal light beams pass through the optical phase modulating device to undergo a selectable phase shift with respect to the reference beams of light. Heterodyne detection of the interference between respective ones of the differentially phase shifted signal and reference light beams is used to generate corresponding electrical beamforming signals to control the transmit and receive electromagnetic radiation patterns of the phased array antenna.

Light beams emanating from the light source are focused by an imaging system onto the aperture of the AOM so as to be Bragg matched, i.e., incident at the desired Bragg angle, to the AOM. The AOM splits the incident beam into two spatially separate beams, separated by twice the acoustic Bragg angle. The AOM also causes the diffracted optical beam to undergo a doppler shift. This doppler shift is equal to the microwave drive frequency of the AOM, which is preferably the same as the desired radar carrier frequency.

The diffracted light beam cluster emerging from the AOM is typically used as the reference beam cluster and the undiffracted light beam cluster is typically used as the signal beam cluster. A spherical lens disposed at one focal length from the AOM focuses the reference and the signal light beams onto collinear but spatially separate paths. A demagnifying optical device is positioned in the path of the signal light beams to reduce the spatial extent of the signal beam cluster so that as the (diffracted) reference beam cluster is translated along the Bragg angle direction as the AOM drive frequency is changed, the full extent of the signal light beam cluster remains within the boundaries (i.e., the spatial extent) of at least a portion of the moving reference light beam cluster. This arrangement of the optical architecture enables the use of the signal control system over a wide tunable bandwidth as the undiffracted beam remains stationary, while the diffracted beam is translated along the Bragg angle direction as the AOM drive frequency is changed. This overlap of the signal and reference beam clusters insures interference between the signal and corresponding reference beams over a wide tunable carrier bandwidth. Because the AOM has a wide (GHz) operational bandwidth, the microwave frequency driving the AOM can be swept to tune the radar carrier, with the undiffracted and diffracted beams remaining collimated after being processed.

A spatial light modulator is disposed in the path of the signal light beams so that the light beams incident on it undergo a selected phase shift dependent on the control voltage applied to each individually controlled pixel. The optical phase modulating device may comprise either a liquid crystal spatial light modulator (SLM) or a deformable mirror device SLM. For example, in a liquid crystal (LC) SLM, the application of a voltage to the individual LC pixels results in a phase shift of the signal light beam passing through that pixel dependent on the voltage applied. Thus, relative to a doppler-shifted, diffracted reference light beam, the signal light beam has a phase shift that is preserved as the microwave signal phase shift and is used on heterodyne detection of the two beams to generate an electrical beamforming signal.

To align the processed signal light beams to be colinear and coincident with the reference light beams, combinations of polarization rotators, polarizing beam splitters, and 45° prisms are used. An optical adder disposed to receive the collimated, colinear and coincident reference (diffracted) and signal (undiffracted) light beams combines the signals and directs them to a lenslet array corresponding to the SLM pixel array so that there is a 1:1 correspondence between the LC pixels and the fibers. At the end of each fiber is a photodiode that provides heterodyne detection of the respective phase-shifted signal light beams and reference light beams, and generates the electrical beamforming microwave signal. A photodiode array is typically electrically coupled through transmit/receive circuitry to control the electromagnetic radiation pattern in the transmit and receive modes of a plurality of antenna elements in a phased array antenna.

BRIEF DESCRIPTION OF THE DRAWINGS

The features of the invention believed to be novel are set forth in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
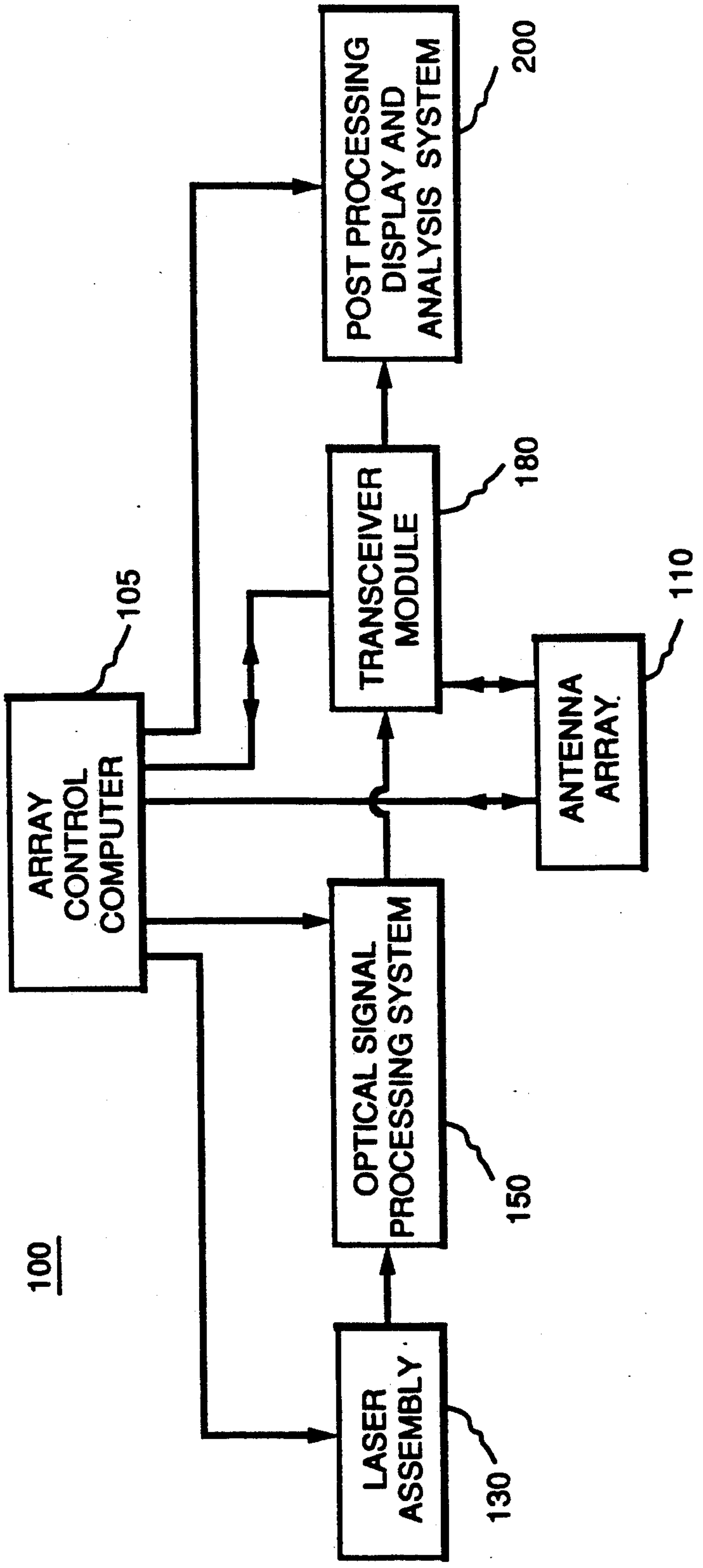
FIG. 1 is a block diagram of a phased array antenna system in which the present invention is employed.

In FIG. 1, a phased array antenna system 100 used in a radar system or the like comprises an array control computer 105, an antenna array 110, a laser assembly 130, an optical signal processing system 150, a transceiver module 180 and a post-processing system 200 for display and analysis. Array control computer 105 is coupled to and generates signals to control and synchronize the operation, described below, of the components listed above so that optical signal processing system 150 controls the transmit and receive electromagnetic radiation patterns of antenna system.

Figure 2:
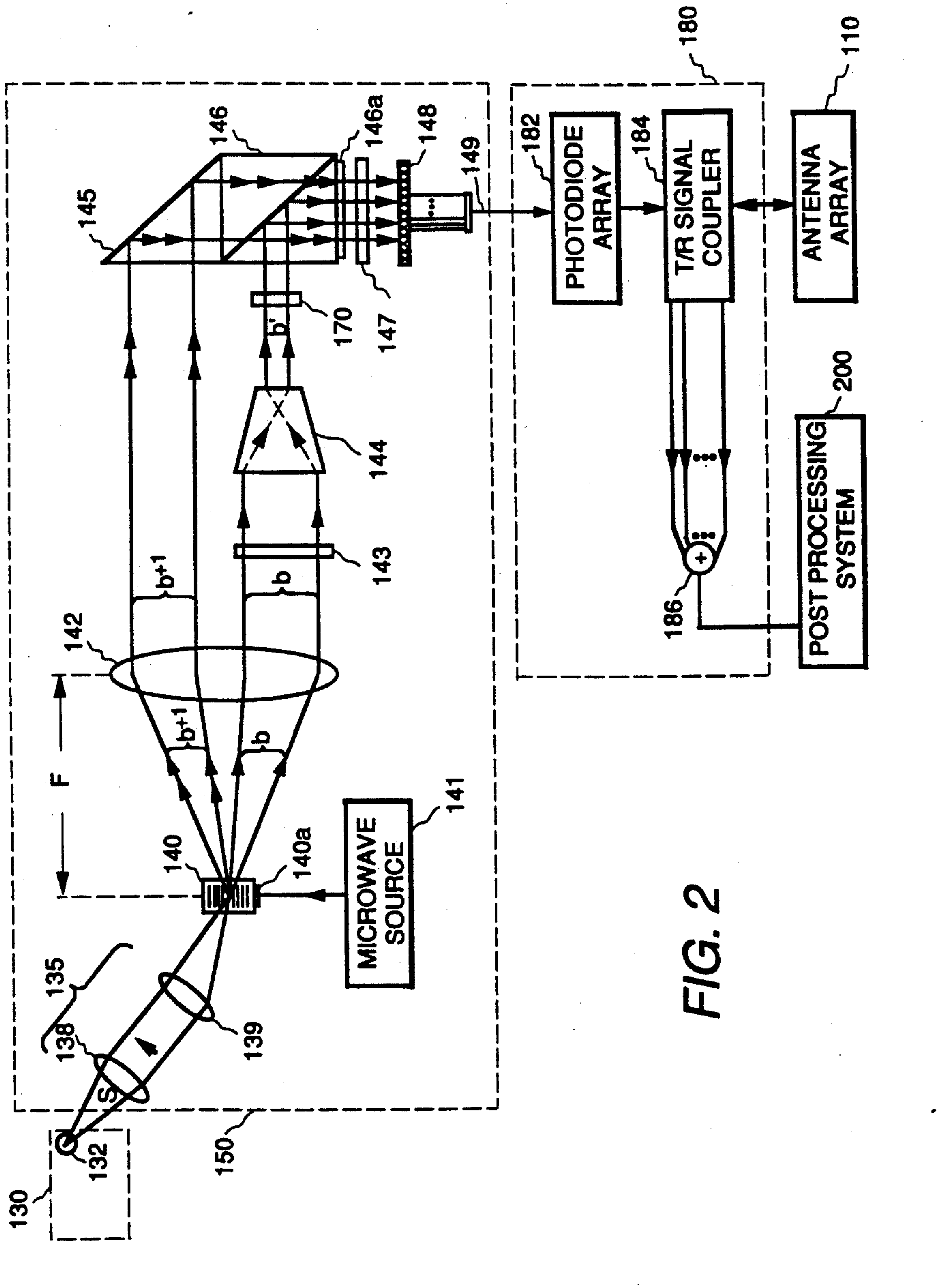
FIG. 2 is a part block and part schematic representation of a phased array antenna system illustrating one embodiment of the present invention.

FIG. 2 illustrates in greater detail certain components of phased array antenna system 100 of FIG. 1 in accordance with one embodiment of the present invention. When the system operates in the transmit mode, electromagnetic energy is radiated into free space by antenna array 110, which typically comprises a plurality of antenna elements (not shown). As used herein, an antenna element may comprise one or more radiating devices (not shown) which, when excited by an electrical signal, radiates electromagnetic energy into free space. In a phased array system, the number and arrangement of the antenna elements are determined by the desired beamforming and detection capabilities for the array. For example, in a typical advanced phased array radar system for target tracking, each face of a four-faced array comprises about 1,000 antenna elements.

Antenna array 110 is coupled to signal processing system 150 via a transceiver module 180, and a transmit fiber optic array link 149. Transceiver module 180 is controlled by array control computer 105 (shown in FIG. 1) to select a transmit or a receive mode of operation of phased array antenna system 100. In the transmit mode, optical signals from signal processing system 150 are converted to electrical beamforming signals in transceiver module 180, which signals are used to drive the antenna elements to radiate electromagnetic energy into free space. In the receive mode, transceiver module 180 couples return electrical signals corresponding to the electromagnetic energy detected by the antenna elements to the electrical signals derived from signal processing system 150 to mix the signals and thereby generate in-phase signals to be added and then processed by post processing system 200 for display and analysis.

As illustrated in FIG. 2, optical signal processing system 150 comprises optical architecture to generate the phase shifts in the drive signals for antenna array 110. As used herein, "optical architecture" refers to the combination of devices for manipulating the direction, diffraction, polarization, or the phase or amplitude of the light beams.

Laser assembly 130 is coupled to optical signal processing system 150 and generates linearly polarized coherent light beams to provide an input signal to the optical architecture of signal processing system 150 to create the drive signals for antenna assembly 110 in the transmit mode. For the purpose of describing the present invention, it will be assumed that laser assembly 130 generates "s" polarized, i.e., horizontally linearly polarized light beams, although "p" polarized, i.e., vertically polarized, light beams may similarly be used with appropriate adjustments in the optical architecture. Laser assembly 130 comprises a laser source 132, which is advantageously a semiconductor laser, but may be any type of laser beam generator that can provide beam intensities sufficient for operation of the optical signal processing system as described in this application. Laser source 132 is typically biased to generate continuous wave radiation, although it can alternatively be intensity modulated at the pulse repetition frequency (PRF) of the radar system.

Laser source 132 is optically coupled to an imaging system 135 disposed in signal processing system 150. Imaging system 135 comprises spherical lenses 138 and 139. Spherical lens 138 is disposed to receive light beams emanating from laser 132 and collimate those beams. In accordance with this invention, lens 139 is disposed to receive the collimated light beams from lens 138 and focus those beams into the aperture of an acousto-optic modulator (AOM) 140. The angular spread of this focussed beam is controlled by the f-number of the spherical lens 139. The direction of the focussed beams is Bragg matched to the center frequency of the AOM.

AOM 140 comprises a transducer 140*a* which is electrically coupled to a microwave source 141. Light incident on AOM 140 is split into two clusters of beams, one of which is undiffracted and one of which is diffracted and doppler shifted by an amount corresponding to the frequency of the microwave signal from microwave source 141 that is driving the AOM. The frequency of the microwave drive signal is selected to cause a doppler shift that, on heterodyne detection with the undiffracted beam, generates a microwave signal of the appropriate frequency to drive the antenna elements to transmit electromagnetic radiation of the desired frequency. Microwave source 141 is adapted to be controllable to generate microwave drive signals for AOM 140 that have different selected frequencies, thus enabling the transmission frequencies of the antenna array to be changed by the manipulation of the microwave drive signal. Such an arrangement further allows the transmission frequency of the antenna to be "swept" or changed rapidly in a controlled fashion, thus significantly minimizing the detectabiliy of, or the ability to jam, the antenna transmissions. The AOM is preferably adapted to be driven by microwave drive signals (i.e., having frequencies in the GHz band), although an rf band AOM can alternatively be used provided the output signal processing system output signals are mixed to increase the frequency to that of the radar carrier.

In general, in systems using an AOM the incident light from the laser source is tightly focussed on an aperture near the center of the acoustic column. By comparison, light incident on an acousto-optic deflector (AOD)/Bragg cell is collimated and is incident across a larger area of the acoustically-driven crystal structure of the AOD. In the typical AOM, there is a relatively small area of the crystal through which the light passes and thus the acoustic wave transit time across this aperture is relatively short, allowing relatively fast (i.e., in the order of nsec) response times which enable correspondingly fast switching times between the use of different frequency drive signals.

The undiffracted and diffracted beam clusters emerging from AOM 140 are spatially separate, and the angular separation between the two beam clusters is equal to twice the Bragg angle. The light beams comprising each beam cluster are of the same linear polarization as the light emanating from laser source 132, which for purposes of describing this invention is assumed to be s-polarized. The undiffracted (or DC) beam cluster is illustrated in FIG. 2 by two representative beams delineating the spatial extent of the beam cluster and identified in FIG. 2 by the single arrows on the representative light beam lines and by the letter "b". As used herein, "spatial extent" refers to the area of space taken up by the constituent light beams making up the beam cluster. The Bragg diffracted, positive first-order doppler shifted, spatially deflected beam cluster is similarly illustrated in FIG. 2 by two representative light beams delineating the spatial extent of the diffracted beam cluster and identified in FIG. 2 by the double arrows on the representative light beams and by the symbol "$b^{+1}$".

As will be further described in detail below, one of the beam clusters generated by AOM 140 is used as a reference beam and one as a signal beam; the light beams making up the signal beam cluster undergo the processing to cause the selected phase shifts to control the beamforming signals used to activate the antenna array. Although each beam cluster emerging from the AOM may be used for either the reference or the signal beams, it is advantageous to use the undiffracted beam cluster as the signal light beams since a greater percentage of the light energy entering AOM 140 passes through undiffracted (e.g., in a typical AOM 90% of the light passes through undiffracted while 10% is diffracted). Thus, for purposes of describing the remainder of the invention, the diffracted beam cluster will be referred to as the reference beam clusters (comprising reference light beams) and the undiffracted beam cluster will be referred to as the signal beam cluster (comprising signal light beams).

A spherical lens 142 having a focal length "F" is optically coupled to AOM 140 and disposed at one focal length distance from AOM 140. Spherical lens 142 is centered between the two light beam clusters emanating from AOM 140 such that the aperture of AOM 140 (on which the light beams incident on the AOM are focussed) is the front focus of lens 142. Lens 142 converts the diverging wavefronts of the light beams in reference beam cluster $b^{+1}$ and signal beam cluster b to collimated beam clusters. The focal length "F" of spherical lens 142 determines the spatial extent of the collimated reference beam cluster signal and beam cluster emerging from the lens. The reference and the signal beam clusters emerging from lens 142 remain collimated and collinear regardless of the driving frequency of AOM 140. As used herein, collimated refers to light beams emanating along parallel paths; collinear refers to light beams that are emanating along parallel paths having the same orientation in space (even if they are spatially separate); and coincident refers to light beams that are passing along the same collinear path.

In accordance with one embodiment of this invention illustrated in FIG. 2, a 45° prism 145 is optically coupled to spherical lens 142 to receive therefrom the s-polarized, diffracted, doppler shifted reference light beam cluster. Prism 145 is further optically coupled to a cube polarizing beam splitter (PBS) 146. The reference light beams are deflected by 90 degrees in prism 145 and directed to PBS 146. PBS 146 is disposed so that the collimated s-polarized reference light beams pass through the device undeflected.

A 90 degree polarization rotator 143 (e.g. a half wave plate) is optically coupled to lens 142 to receive the signal beam cluster therefrom. Polarization rotator 143 is disposed so that the linear polarization orientation of the signal light beams is shifted from s-polarized to p-polarized. Polarization rotator 143 is further optically coupled to a demagnifying optical device (demagnifier) 144. The spatial extent of the signal beam cluster is reduced as the beams pass through demagnifier 144, and is identified in FIG. 2 by "b". Demagnifier 144 is optically coupled to a liquid crystal spatial light modulator (SLM) 170, in which the signal light beams are processed to have selected phase shifts as described more fully below. SLM 170 in turn is optically coupled to PBS 146. The s-polarized signal light beams entering PBS 146 are deflected by 90° to be collinear and coincident with the reference light beams passing through said PBS from prism 145.

Demagnifier 144 is selected to provide a sufficient reduction in the spatial extent of the signal beam cluster so that for any selected drive frequency of AOM 140 (changes in which will cause some small spatial deflection of the diffracted reference beam cluster emanating from AOM 140) the spatial extent of the signal beam cluster passing from PBS 146 is smaller than, and within the boundaries of, the spatial extent of the reference beam cluster passing from the PBS. Thus, as the frequency of the AOM drive signal is varied, the reference beam cluster linearly translates across the signal beam cluster, but (within a specified antenna carrier bandwidth) at all times overlaps the signal beam cluster. In this way, regardless of the frequency selected for the microwave signal to drive AOM 140, the processed and collimated signal light beams will always be collinear and coincident with reference light beams. This arrangement provides a wide antenna tunable bandwidth by enabling the use of different carrier frequencies without moving any of the components of the signal processing system. A feature of the optical signal control system in accordance with this invention is that, because of the large Bragg angle associated with wideband (GHz) AOMs, the system can have a compact design and high phase stability.

SLM 170 advantageously comprises a two dimensional pixel array comprising individually controllable nematic liquid crystals. The pixel array corresponds to the antenna array so that a separate selectively phase delayed signal light beam is generated for each antenna element in the antenna array to be individually controlled. By way of example and not limitation, the nematic director in each LC pixel is aligned along the p or vertical direction. Thus, a change in the control voltage applied to a LC pixel affects the index of refraction along the p-direction, causing phase modulation of p-polarized signal light beams passing through respective ones of the pixels. Array control computer 105 (FIG. 1) is coupled to SLM 170 to selectively control the individual pixels.

PBS 146 is disposed so that the signal light beams entering from SLM 170 are deflected to be colinear and coincident with reference light beams passing through PBS 146 at an output port 146*a* of PBS 146. A 45 degree-oriented polarizer 147 is optically coupled to receive the light beams passing from PBS output port 146*a* so each respective coincident p-polarized reference beam and s-polarized signal beam are combined. Polarizer 147 is optically coupled to a two-dimensional lenslet array 148 corresponding to the pixel array of SLM 170 and antenna array 110. A single mode fiber optic array link 149 is coupled to lenslet array 148 and transceiver module 180 so as to carry the optical signals therebetween.

In accordance with this invention, transceiver module 180 comprises a heterodyne detection system for the optical signals, for example a photodiode array 182, and further comprises a transmit/receive signal coupler array 184 and a signal adder 186. Each fiber in fiber optic array link 149 is terminated in a respective photodiode in photodiode array 182. Each photodiode detects the interference between respective ones of the positive first order (+1) doppler shifted reference light beams and signal light beams, and generates a corresponding electrical beamforming signal. In the heterodyne detection of the optical signal pairs, the electrical beamforming signals generated by the photodiodes have a frequency that is a function of the frequency of the microwave drive signal of AOM 140. Photodiode array 182 is electrically coupled to transmit/receive coupler array 184, which couples the beamforming signals to the antenna array in the transmit mode and combines the detected return signals received from the antenna array in the receive mode with the desired beamforming signal to generate in phase signals from each of the antenna elements to be added by signal adder 186 in the receive mode.

Figure 3:
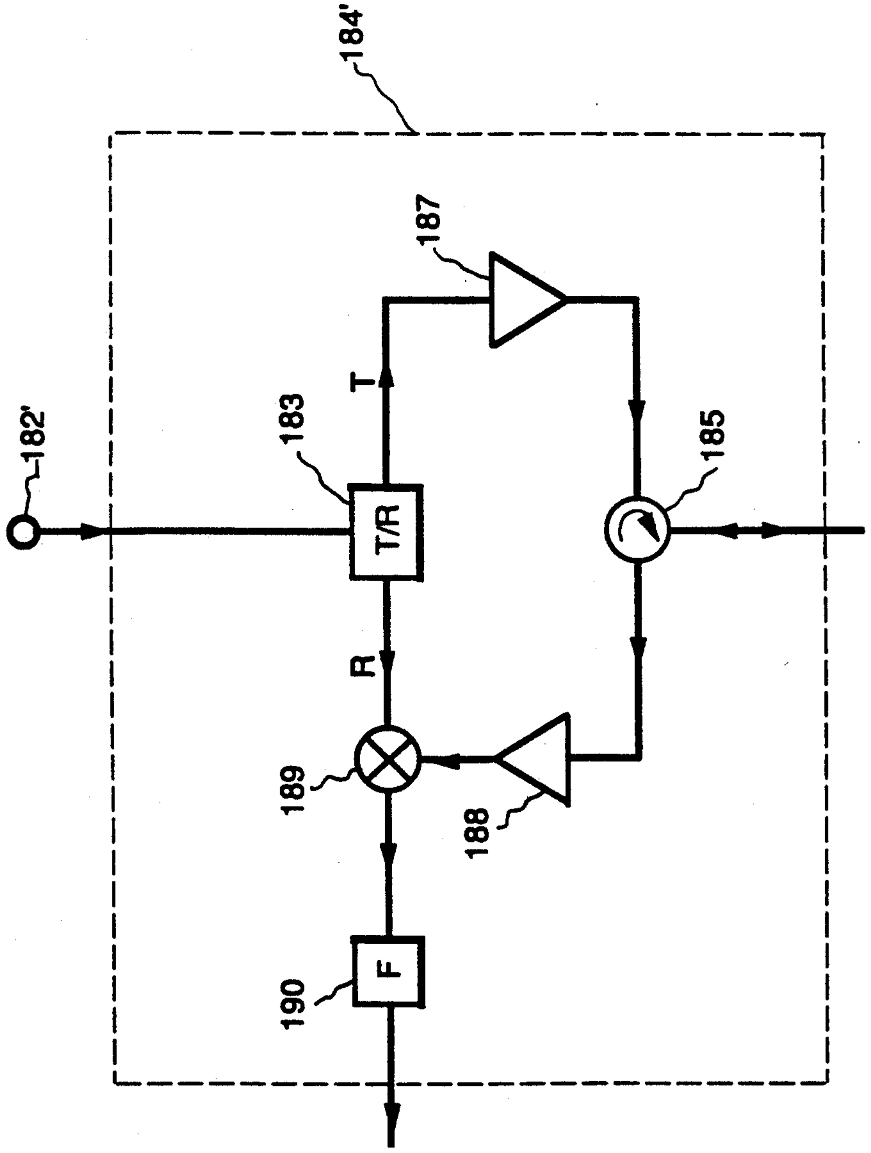
FIG. 3 is a part block and part schematic representation of a transceiver module in accordance with the present invention.

Transmit/receive (T/R) coupler array 184 comprises a plurality of channels to process signals for the respective antenna elements or subassemblies of elements. A representative channel 184' (for controlling one antenna element or subassembly of elements) of coupler 184 is illustrated in FIG. 3. Transmit/receive (T/R) coupler channel 184' comprises T/R switch 183, circulator 185, solid state amplifiers 187, 188, mixer 189 and filter 190. A photodiode 182' in photodiode array 182 (FIG. 2) is electrically coupled to T/R switch array 183, which is controlled to selectively connect the electrical beamforming signal from photodiode 182' to either power amplifier 187 (in the transmit (T) mode) or to mixer 189 (in the receive (R) mode). In the transmit mode, the electrical beamforming signal is amplified in amplifier 187 and directed to the controlled antenna element (not shown) via circulator 185.

In the receive mode, the phased array antenna system is used to "view" a particular angle of space with respect to the antenna array to determine the intensity of electromagnetic radiation of the desired frequency being received from that direction. In a radar system, for example, the strength or intensity of the radiation received from a given angle determines Whether a target is detected in that direction. The phase generated by SLM 170 (FIG. 2) in the optical processor determines the beam angle of the phased array antenna in either a transmit or a receive mode. Thus, in the receive mode, and with reference to FIG. 3, the return signals detected in the antenna elements are directed through circulator 185 to low noise amplifier 188, and are mixed in mixer 189 with the reference electrical beamforming signal from photodiode 182'. This reference signal replicates the transmit control signal for each antenna element. Thus, on mixing the receive and reference signals in mixer 189, the phase shifts in the signal cancel out, and in-phase baseband signals indicating the presence or absence of a return pulse at the selected angle with respect to the antenna are generated. Alternatively, IF (intermediate frequency) signals can be used for this processing. Mixer 189 is coupled to electronic lowpass filter 190 (IF filter if IF signals used), through which the in-phase baseband/IF signal passes enroute to adder 186 (FIG. 2). These in-phase baseband/IF signals generated from the detected signals supplied by the antenna elements are added in microwave adder 186 to maximize the signal-to-noise ratio.

Figure 4:
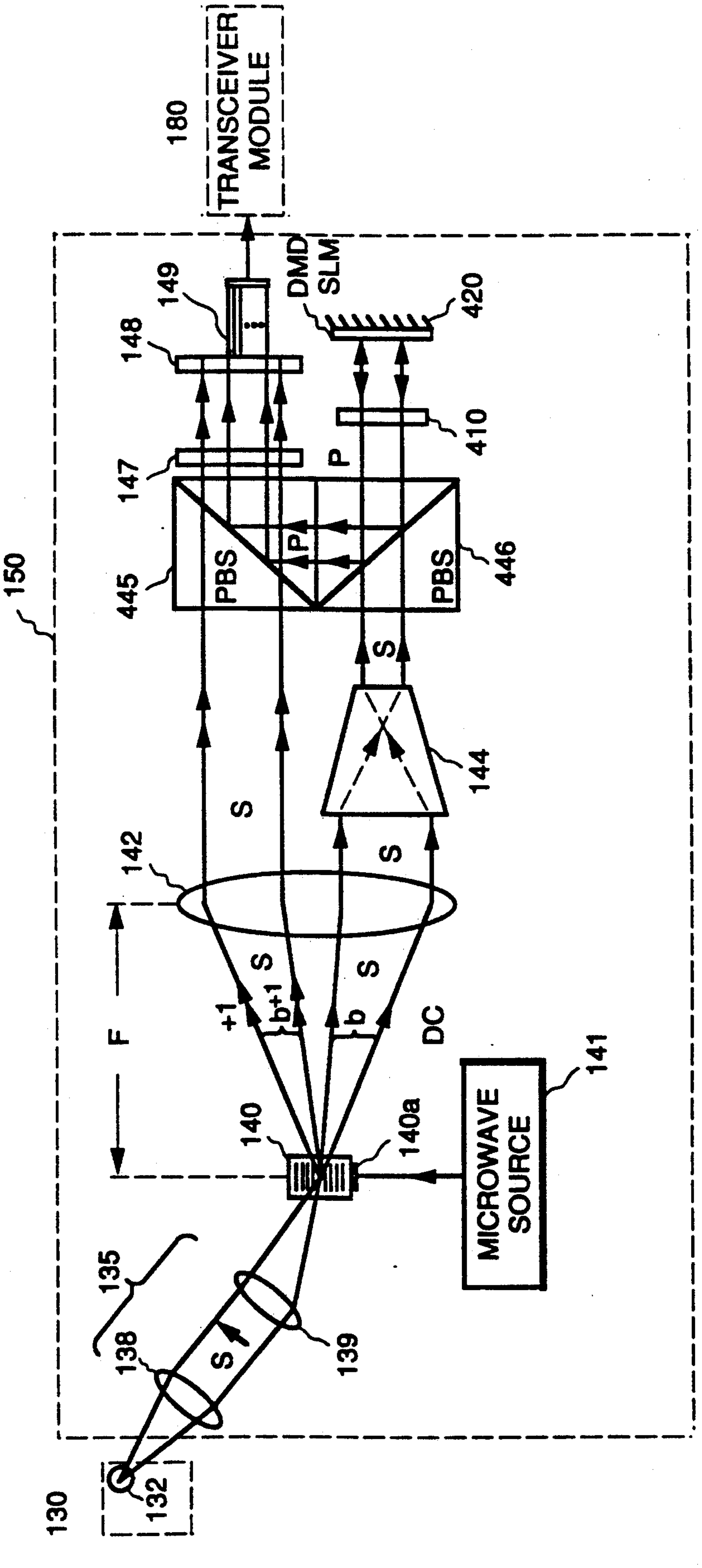
FIG. 4 is a part block and part schematic representation of a phased array antenna system illustrating a second embodiment of the present invention.

An alternative embodiment of this invention is illustrated in FIG. 4. In this alternative embodiment, optical signal processing system 150 comprises a deformable mirror device (DMD) SLM 420 and a quarter-wave plate 410 in lieu of spatial light modulator 170 and 90° polarization rotator 143 shown in FIG. 2. The optical architecture to align the processed signal light beams and reference beams to be collinear and coincident also differs as described below.

As shown in FIG. 4, the arrangement of laser assembly 130, imaging system 135, AOM 140, and spherical lens 142 is as described above with respect to FIG. 2. A first polarizing beam splitter 445 is optically coupled to spherical lens 142 and disposed to receive reference beam cluster $b^{+1}$ therefrom. First PBS 445 is disposed so that s-polarized reference light beams pass through it undeflected.

Demagnifier 144 is optically coupled to lens 142 to receive the signal beam cluster and to pass the demagnified signal beam cluster to a second PBS 446. Second PBS 446 is disposed so that the s-polarized signal light beams emanating from demagnifier 144 pass therethrough undeflected. Quarter-wave plate 410 is optically coupled to second PBS 446 and DMD SLM 420. Unprocessed, s-polarized signal light beams emanating from second PBS 446 undergo a shift to circular polarization as they pass through the quarter-wave plate enroute to the DMD SLM.

DMD SLM typically comprises a two dimensional pixel array of individually controllable DMDs. Array control computer 105 (FIG. 1) determines the control signals directed to each DMD, causing the mirrors to be selectively displaced along the respective paths of the incident signal light beams. The signal light beams incident on the DMDs are reflected back along substantially the identical path by which they arrived, but now emanating in the opposite direction, i.e., back towards quarter-wave plate 410. The relative displacement of the respective mirrors results in the respective signal light beams experiencing different phase shifts (when measured across a plane perpendicular to the path the beams are travelling, e.g., at quarter-wave plate 410).

The processed signal light beams reflected off of DMD SLM 420 pass back through quarter-wave plate 410 and undergo a further polarization shift, back to linear polarization, resulting in the processed signal light beams emerging from quarter-wave plate 410 each being p-polarized (the shift to p-polarization of the original unprocessed s-polarized beams results from the light beams passing through the quarter wave plate two times, once while passing to the DMD SLM and once after being reflected from the DMD SLM). This now p-polarized processed signal light beams reenter second PBS 446 and are deflected by 90° into first PBS 445, which is optically coupled to the second PBS. These p-polarized processed signal beams entering first PBS 445 are deflected by a further 90° so that they are collinear and coincident with reference light beams passing through first PBS 445.

Alternatively, a non-polarizing beam splitter (not shown) can be used in lieu of PBS 446 and quarter wave plate 410. In this arrangement, some portion of the signal light beams emanating from demagnifier 144 pass directly through to DMD SLM 420, while the remainder are deflected out of the signal processing system. The processed signal light beams reflected off of DMD SLM 420 reenter the non-polarizing beam splitter, and some portion of the beams is deflected by 90° up into PBS 445, while some portion continues on a path back towards demagnifier 144. Of those beams deflected towards PBS 445, some portion is again deflected by 90° to be collinear and coincident with the reference beams. This arrangement, however, is less optically efficient than the first DMD SLM arrangement disclosed above, and also generates undesirable back reflection into demagnifier 144.

In the arrangement using the coupled PBS's illustrated in FIG. 4, first PBS 445 is optically coupled to 45° polarizer 147 to combine the oppositely polarized reference and signal light beams. In the alternative arrangement using a non-polarizing beam splitter to transfer light beams to and from DMD SLM 420, polarizer 147 is not required as the reference and signal beams are still of the same polarization. The coincident and collinear reference and signal light beams passing from first PBS 445 are processed as described above with respect to passing through two-dimensional lenslet array 148 and single mode fiber array 149 to transceiver module 180, where the optical signals are converted to electrical beamforming signals. As with the earlier-described embodiment, this embodiment also allows a wide tunable bandwidth.

Both embodiments of the present invention described (using a liquid crystal SLM or a DMD SLM) above comprise an AOM, which provides a relatively fast (i.e., in the nanoseconds range) response time of the device for switching from one carrier frequency to another. This quick response time is substantially due to the small active aperture of an AOM. For example, a typical AOM uses only about an 18 mm focussed optical beam diameter, providing a 4 nsec response time, while still allowing an adequate tradeoff between response time and AOM diffraction efficiency. The rapid frequency modulation of the light beam enables use of an antenna system with a high speed frequency hopping capability.

When a nematic LC SLM is used as the optical phase modulating device, use of relatively high voltage ($\approx$50 V) nematic liquid crystal control voltages results in LC switching times of about 100 μsecs between respective transmit/receive sequences, providing approximately 1500 rpm rotation rates for the phased array. Such a rotation rate is about two orders of magnitude faster than typical mechanical scan rates. If necessary, faster scan times (of about 200 beams/sec or higher) can be generated using the multi-channel time multiplexed beam scanning technique disclosed in application Ser. No. 07/826,501, filed Jan. 27, 1992, cited above.

Further, the signal processing system 150 of this invention is relatively compact (e.g., about 12 inch in length or less) while still providing control of large (up to a million, e.g., a 1000×1000 antenna element array) phased array antennas.

It will be readily understood by those skilled in the art that the present invention is not limited to the specific embodiments described and illustrated herein. Many variations, modifications and equivalent arrangements will now be apparent to those skilled in the art, or will be reasonably suggested by the foregoing specification and drawings, without departing from the substance or scope of the invention. Accordingly, it is intended that the invention be limited only by the spirit and scope of the appended claims.

What is claimed is:

1. An optical signal control system comprising:

a source of coherent, polarized light;

acousto-optic means for generating a reference beam cluster and a signal beam cluster from light beams emanating from the light source, each of said clusters comprising a plurality of light beams; one of said beam clusters being diffracted and one of said beams clusters being undiffracted;

an optical phase modulating device coupled to said acousto-optic means and disposed to selectively delay the phase selected light beams in said signal beam cluster;

means for combining along collinear paths said reference light beams said signal light beams passing from said modulating device; and heterodyne means for detecting interference between respective ones of the combined signal light beams and corresponding reference light beams.

2. The system of claim 1 wherein said acousto optic means comprises an acousto-optic modulator (AOM) driven by a microwave source for generating a drive signal within a selected frequency range.

3. The system of claim 2 further comprising a spherical lens optically coupled to said AOM and disposed at one focal length therefrom so as to redirect said reference beam cluster and said signal beam cluster along spatially separate colinear paths.

4. The system of claim 3 further comprising a demagnifying optical device optically coupled to said optical phase modulating device and disposed in the path of said signal beam cluster so as to reduce the spatial extent of said signal beam cluster.

5. The system of claim 4 further comprising an imaging system optically coupled to said light source and said AOM and disposed to focus the light beams emanating from said light source into an aperture of said AOM along a path that is Bragg matched to the driving frequency of said AOM.

6. The system of claim 5 wherein said optical phase modulating device comprises a liquid crystal spatial light modulator (SLM) comprising a two-dimensional array of pixels, said SLM being disposed so that each of the light beams comprising said signal beam cluster passes through a respective one of said pixels thereby generating a plurality of processed signal beams each having a selected phase shift.

7. The system of claim 6 wherein said means for combining said reference and said signal beam clusters comprises:

a 90° polarization rotator disposed in the path of said signal beam cluster so as to shift the linear polarization of the signal light beams to a polarization orientation orthogonal to the polarization orientation of the reference light beams;

a polarizing beam splitter (PBS) disposed in the path of said signal light beams passing from said spatial light modulator and said polarization rotator so as to deflect the path of travel of said beams by 90°; and a 45° prism optically coupled to said PBS and disposed in the path of said reference beam cluster so as to deflect the path of travel of the reference light beams by 90°;

said PBS and said prism being oriented so that said reference light beams and said signal light beams are deflected onto collinear and coincident paths.

8. The system of claim 7 wherein said system further comprises:

a 45° polarizer optically coupled to said PBS so as to add respective ones of said signal light beams and said reference light beams emerging from said PBS along colinear and coincident paths;

a two-dimensional lenslet array optically coupled to said 45° polarizer; and an optical fiber array coupled to said lenslet array and said heterodyne detection means.

9. The system of claim 8 wherein said heterodyne means for detecting interference comprises an array of photodiodes coupled to said optical fiber array so that respective ones of the added reference and signal light beam pairs are detected by a predetermined respective one of said photodiodes.

10. The system of claim 5 wherein said optical phase modulating device comprises an array of deformable mirror devices (DMD), each of said DMDs being disposed so that each of the light beams comprising said signal beam cluster is aligned with a respective one of said DMDs and is reflected off of said respective ones of said DMDs thereby generating a plurality of processed signal light beams having respective selected phase shifts.

11. The system of claim 10 wherein said means for combining said reference and said signal beam clusters comprises:

a first polarizing beam splitter (PBS) optically coupled to said demagnifying optical device and disposed so that said signal light beams incident on said first PBS from said demagnifying optical device pass therethrough undeflected;

a quarter-wave plate optically coupled to said first PBS and said DMD array and disposed so that said signal light beams pass therethrough prior to striking said DMD array and said processed signal light beams pass therethrough after reflecting off said DMD array, thereby rotating the polarization orientation of said beams each time said beams pass therethrough so that said processed signal light beams emerging from said quarter wave plate have a polarization orientation orthogonal to that of the unprocessed signal light beams entering said rotator; and a second polarizing beam splitter (PBS) optically coupled to said first PBS and to said spherical lens and disposed so that said reference light beams pass therethrough undeflected;

said first and second PBS's being positioned with respect to each other so that said processed signal light beams reentering said first PBS from said quarter wave plate are deflected by 90° to enter said second PBS and are deflected by a further 90° to a path that is collinear and coincident with the paths of said reference light beams.

12. The system of claim 11 further comprising:

a 45° polarizer optically coupled to said second PBS so as to add respective ones of said signal light beams and said reference light beams emerging from said second PBS along colinear and coincident paths;

a two-dimensional lenslet array optically coupled to said 45° polarizer; and an optical fiber array coupled to said lenslet array and said heterodyne means.

13. The system of claim 12 wherein said heterodyne means for detecting interference comprises an array of photodiodes coupled to said optical fiber array so that respective ones of the added reference and signal light beam pairs are detected by a predetermined respective one of said photodiodes.

14. The system of claim 13 wherein said demagnifying optical device is selected to reduce the spatial extent of said signal beam cluster to a size so that all of said processed signal beams emerging from said means for combining said reference and said signal beams are coincident with respective ones of said reference light beams for any one of said selected drive frequencies of said AOM.

15. The system of claim 9 wherein said demagnifying optical device is selected to reduce the spatial extent of said signal beam cluster to a size so that all of said processed signal beams emerging from said means for combining said reference and said signal beams are coincident with respective ones of said reference light beams for any one of said selected drive frequencies of said AOM.

16. A phased array antenna system comprising:

a laser assembly adapted to generate beams of coherent, linearly polarized light;

an optical signal processing system optically coupled to said laser assembly, said signal processing system being adapted to produce a plurality of reference light beams and a plurality of differentially phase shifted signal light beams in a manner such that said signal light beams and said reference light beams will pass from said system along collinear and coincident paths, said optical signal processing system comprising:

an acousto-optic modulator (AOM) being disposed so that incident light beams will be Bragg matched to said AOM and so that light beams that pass therethrough will split into a diffracted beam cluster and an undiffracted beam cluster, a predetermined one of said beam clusters comprising a reference beam cluster and one of said beam clusters comprising a signal beam cluster, said AOM being adapted to be driven by a microwave source having a selected drive frequency; and an optical phase modulating device coupled to said AOM so that the predetermined signal light beams will pass therethrough, said optical phase modulating device comprising a plurality of pixels so that respective ones of said signal light beams will pass throug a respective corresponding pixel, each of said pixels being individually controllable to selectively change the phase of the signal light beam passing therethrough;

a transceiver module coupled to said optical signal processing system comprising a heterodyne detection array of photodiodes, each of said photodiodes being disposed to receive corresponding ones of said reference and signal light beams so as to convert said light beams into electrical beamforming signals, said corresponding reference and light beam signals being collinear and coincident; and an antenna array electrically coupled to said transceiver module, said array comprising a plurality of antenna elements and being operable in a transmit or receive mode, each of said antenna elements being driven by a respective one of said electrical beamforming signals, said electrical beamforming signals collectively controlling the transmit and receive electromagnetic patterns of said antenna array.

17. The system of claim 16 further comprising:

an imaging system optically coupled to said laser assembly and to said AOM and disposed to focus light beams emanating from said light source onto the aperture of said AOM at the Bragg angle corresponding to the driving frequency of said AOM;

a spherical lens optically coupled to said AOM so as to receive said diffracted and said undiffracted light beam clusters therefrom, said spherical lens being disposed at one focal length from said AOM so as to redirect said reference beam cluster and said signal beam cluster along spatially separate collinear paths, and a demagnifying optical device optically coupled to said optical phase modulating device and disposed in the path of said signal beam cluster so as to reduce the spatial extent of said signal beam cluster.

18. The system of claim 17 wherein said optical phase modulating device comprises a liquid crystal spatial light modulator (SLM) including a two-dimensional array of pixels, said SLM being disposed so that each of the light beams comprising said signal beam cluster passes through a respective one of said pixels.

19. The system of claim 18 further comprising:

a 90° polarization rotator disposed in the path of said signal beam cluster so as to shift the linear polarization of the signal light beams to a polarization orientation orthogonal to the polarization orientation of the reference light beams;

a polarizing beam splitter (PBS) disposed in the path of said signal light beams passing from said spatial light modulator and said polarization rotator so as to deflect the path of travel of said beams by 90° ; and a 45° prism optically coupled to said PBS and disposed in the path of said reference beam cluster so as to deflect the path of travel of the reference light beams by 90°;

said PBS and said prism being oriented so that said reference light beams and said signal light beams will be deflected onto collinear paths, and said signal light beams will further be coincident with at least a portion of said reference light beams.

20. The system of claim 19 wherein said system further comprises:

a 45° polarizer optically coupled to said PBS so as to add respective ones of said signal light beams and said reference light beams emerging from said PBS along collinear and coincident paths;

a two-dimensional lenslet array optically coupled to said 45° polarizer; and an optical fiber array coupled to said lenslet array and said photodiode array.

21. The system of claim 20 wherein each of said liquid crystal pixels comprises a nematic liquid crystal device.

22. The system of claim 21 wherein said optical modulating device is disposed with respect to said AOM so that said undiffracted light beams emerging from said AOM pass into said modulating device to be processed as said signal beam cluster.

23. The system of claim 17 wherein said optical phase modulating device comprises a two dimensional array of deformable mirror device (DMD) pixels, each of said DMD pixels being disposed so as to receive a predetermined one of said signal light beams and to reflect a processed signal light beam.

24. The system of claim 23 further comprising:

a first polarizing beam splitter (PBS) optically coupled to said demagnifying optical device and disposed so that said signal light beams incident on said first PBS from said demagnifying optical device pass therethrough undeflected;

a quarter-wave polarization rotator optically coupled to said first PBS and the DMD array and disposed so that said signal light beams pass therethrough prior to striking said DMD array and said processed signal light beams pass therethrough after reflecting off said DMD array, thereby rotating the linear polarization orientation of said beams by 45° each time said beams pass therethrough so that said processed signal light beams emerging from said quarter wave polarization rotator have a linear polarization orientation orthogonal to that of the unprocessed signal light beams entering said rotator; and a second polarizing beam splitter (PBS) optically coupled to said first PBS and to said spherical lens and disposed so that said reference light beams pass therethrough undeflected;

said first and second PBS's being positioned with respect to each other so that said processed signal light beams reentering said first PBS from said quarter wave plate are deflected by 90° to enter said second PBS and are deflected by a further 90° to a path that is collinear and coincident with the paths of said reference light beams.

25. The system of claim 24 further comprising:

a 45° polarizer optically coupled to said second PBS so as to add respective ones of said signal light beams and said reference light beams emerging from said second PBS along collinear and coincident paths;

a two-dimensional lenslet array optically coupled to said 45° polarizer; and an optical fiber array coupled to said lenslet array and said heterodyne means.

26. The system of claim 23 wherein said microwave source is adapted to selectively vary the frequency of the drive signal of said AOM.

27. The system of claim 26 wherein said demagnifying optical device is adapted to reduce the spatial extent of said signal beam cluster to a size so that the spatial extent of said reference beam cluster incident on said lenslet array is greater than the spatial extent of said processed signal beam cluster simultaneously incident on said lenslet array for any one of the selected drive frequencies of said AOM.

28. The system of claim 18 wherein said microwave source is adapted to selectively vary the frequency of the drive signal of said AOM.

29. The system of claim 28 wherein said demagnifying optical device is adapted to reduce the spatial extent of said signal beam cluster to a size so that the spatial extent of said reference beam cluster incident on said lenslet array is greater than the spatial extent of said processed signal beam cluster simultaneously incident on said lenslet array for any one of the selected drive frequencies of said AOM.

30. The system of claim 29 wherein said optical modulating device is disposed with respect to said AOM so that said undiffracted light beams emerging from said AOM pass into said modulating device to be processed as said signal beam cluster.

31. A method of processing optical signals to control a phased array antenna having a plurality of antenna elements, comprising the steps of:

passing a plurality of coherent, linearly polarized light beams through an acousto-optic modulator (AOM) to split said beams into a reference beam cluster and a spatially separate signal beam cluster such that one of said beam clusters emerging from said AOM is undiffracted and the other one of said beam clusters is diffracted;

shifting the phase of selected ones of the signal light beams with respect to the reference light beams;

detecting interference between relative phases of respective ones of said signal light beams and said reference light beams and generating an electrical beamforming signal corresponding to the detected interference for each of said signal light beams and a corresponding reference beam; and controlling the transmit and receive electromagnetic radiation patterns of said phased array antenna with said electrical beamforming signals.

32. The method of claim 31 wherein the step of passing light beams through said AOM comprises the steps of:

focusing said plurality of coherent, linearly polarized light beams incident on an aperture of said AOM so as to Bragg match said incident beams to said AOM; and optically directing said reference beam cluster and said signal beam cluster onto collinear and spatially separate paths.

33. The method of claim 32 further comprising the step of driving said AOM with a microwave signal selected from a predetermined range of frequencies.

34. The method of claim 33 wherein the step of shifting the phase of selected ones of the signal light beams comprises passing said light beams through an optical phase modulating device, said device comprising an array of pixels corresponding to the number of said antenna elements to be controlled in said phased array antenna.

35. The method of claim 34 wherein the step of detecting interference between relative phases of light beams in said optical signal pairs comprises directing respective ones of said optical signal pairs into corresponding photodiodes arranged in an array and generating a plurality of respective electrical beamforming signals.

36. The method of claim 35 further comprising the step of aligning said reference light beams and said signal light beams along collinear and coincident paths after said signal light beams emerge from said optical phase modulating device.

37. The method of claim 36 wherein said optical phase modulating device comprises a liquid crystal spatial light modulator having an array of pixels and the step of shifting the phase of selected ones of said signal light beams further comprises selectively adjusting the control voltage of individual ones of the liquid crystal pixels.

38. The method of claim 36 wherein said optical phase modulating device comprises an array of deformable mirror devices (DMDs) and the step of shifting the phase of selected ones of said signal light beams further comprises selectively displacing individual ones of said DMDs.

* * * * *